No. 754,683. PATENTED MAR. 15, 1904.
F. NEIDL.
COMBINATION HANGING BASKET AND POT.
APPLICATION FILED MAR. 16, 1903.
NO MODEL.
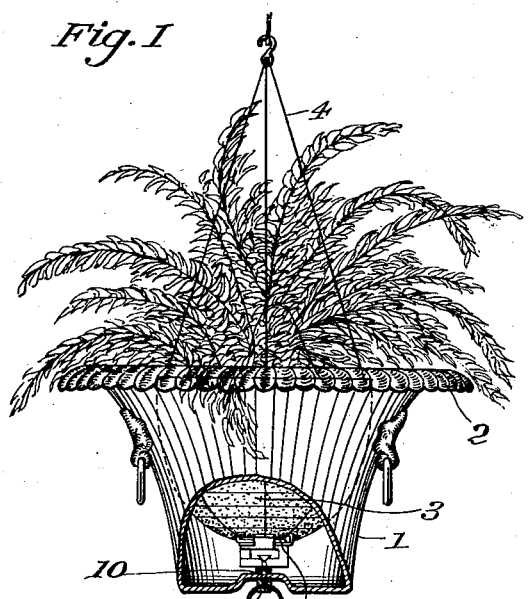
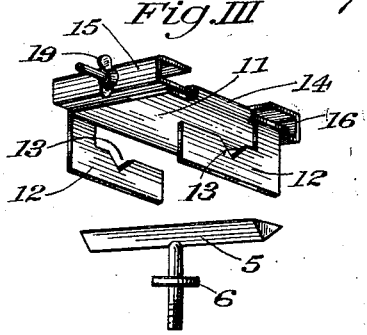
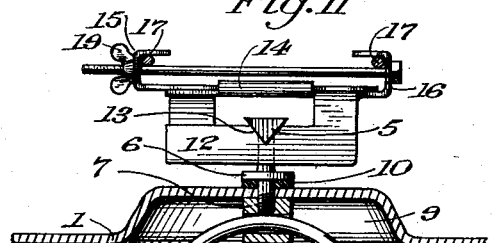
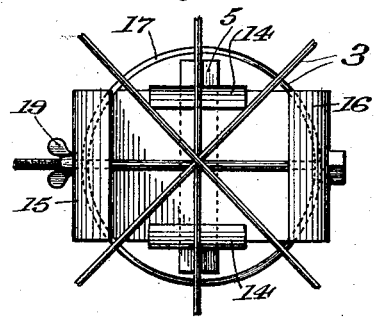
Witnesses
C. C. Holly
G. T. Hackley
Inventor
Frank Neidl
by Townsend Bros
his Attys.

No. 754,683. Patented March 15, 1904.

UNITED STATES PATENT OFFICE.

FRANK NEIDL, OF LOS ANGELES, CALIFORNIA.

COMBINATION HANGING BASKET AND POT.

SPECIFICATION forming part of Letters Patent No. 754,683, dated March 15, 1904.

Application filed March 16, 1903. Serial No. 147,905. (No model.)

*To all whom it may concern:*

Be it known that I, FRANK NEIDL, a citizen of the United States, residing at Los Angeles, in the county of Los Angeles and State of California, have invented a new and useful Combination Hanging Basket and Pot, of which the following is a specification.

An object of this invention is to provide means for conveniently and effectively watering plants in hanging baskets, at the same time preventing the dripping of water from such baskets by protecting the same by detachably fastening thereto a jardinière or other receptacle, as a pot, which is fastened on the basket and extends below the same. The jardinière may be painted and ornamented in fancy and artistic designs.

Another object is to permit water to be placed in the jardinière or pot before the same is attached to the basket, which does away with the awkwardness of reaching up and watering the plants.

Another object is to provide means whereby the detachable connection which connects the pot to the basket may be applied to any hanging basket now in use without requiring the reconstruction of the basket.

Heretofore in watering flowers or plants which are contained in baskets suspended from the ceiling or wall it has been necessary to reach up and take down the basket and place it over some spot which will not be injured by the dripping of water from the basket which results when the water is poured among the roots. By this invention such precaution and inconvenient handling is not necessary, as the basket need not be removed from its position. Water may be merely placed in the jardinière and the latter readily attached to the basket.

Referring to the drawings, Figure I is a side elevation, partly in section, of a combination hanging basket and detachable pot, the pot being shown partly in section. Fig. II is a side elevation of the detachable fastening device in detail, a portion of the bottom of the pot to which it is shown connected being shown in section. Fig. III is a perspective of the two members comprising the attaching device. Fig. IV is a plan view of the attaching device, a portion of the wires forming the bottom of the basket being shown with the attaching device applied thereto.

1 designates a receptacle, in the present instance a jardinière or pot, the upper rim of which is preferably rolled and flanged, as at 2. 3 designates the wire basket, which contains the flowers. The basket 3 may be suspended by connections 4. One member of the connection between the basket and pot consists of a T-bar 5, the vertical post of which is threaded and provided with a flange 6, the horizontal arm being triangular in cross-section. The post of the T-bar passes through the bottom of the jardinière, and screwed to the post under the jardinière is a nut 7, which is provided with an eye, through which passes a ring 8. The bottom of the jardinière is cupped, as at 9, to permit the ring 8 to be housed therein. Interposed between the flange 6 and the bottom of the jardinière 1 is a rubber washer 10, which prevents water from within the jardinière leaking out around the T-bar. The other member of the connection is a bracket 11, provided with a pair of depending wings 12. The wings 12 are symmetrical and connected to diagonally opposite corners of the bracket 11. Each wing 12 is provided with a V-shaped notch 13, the notches being opposite each other. The opposite edges of the bracket 11 are folded over, as at 14, to form lips which retain the sliding adjustable clip 15. 16 is a stationary clip integral with the bracket 11. The bottoms of wire baskets as used for flowers and plants are usually provided with circular wires, as at 17 in Figs. II and IV. In attaching the bracket to the wire basket the clip 16 is hooked over one side of the wire 17. The slidable clip 15 is then pushed up and hooked over the opposite portion of the wire 17. A bolt 18 passes through the clips 15 and 16 and is furnished with a thumb-screw 19. When the clips have been properly attached to the wire 17, the thumb-screw 19 is screwed up, which draws the clips 15 and 16 toward each other, and they securely clamp the bracket to the basket.

In attaching the jardinière to the basket it is turned so that the V-shaped part of the T-bar lies within the wings 12 and between the same. The jardinière is then pushed up until the horizontal part of the T-bar comes above the wings 12. The jardinière is then turned from right to left, which throws the horizontal part of the T-bar across the upper edges of the wings 12. The jardinière is then dropped slightly, which allows the triangular bar to seat itself in the notches 13. The jardinière is then supported and securely retained in position. If at any time it is desired to remove the jardinière, it is accomplished by slightly lifting the jardinière and turning it a quarter around to the left, which frees the T-bar from the wings 12 and allows the jardinière to be taken down.

It will thus be seen that I provide an attaching device adapted to be permanently secured to the basket in combination with means adapted to quickly and conveniently attach the pot to said device while said device remains secured to the basket.

It will be seen that the jardinière forms a perfect protection for carpets or furniture from the dripping of water from hanging baskets. Thus it is possible to hang flowers in baskets which are equipped with this invention in parlors, reception-halls, &c., the jardinière catching any and all water that may drip from the basket.

The jardinière or pot may be constructed in any desired manner, either in plain form or with elaborate ornamentation, and it may be constructed of metal, of indurated fiber, or any other desired material. When the jardinière is constructed of fiber, it is very light and easy to handle, and the fiber readily lends itself to embossing or other fanciful ornamentation.

It is possible to water the plants by placing water within the jardinière and then putting the jardinière in place below and around the basket instead of pouring water directly into the basket, the roots of the plants or flowers freely absorbing the water from the jardinière.

It should be understood that I reserve the right to make such alterations and changes as may come within the spirit of my invention.

Having described my invention, what I claim, and desire to secure by Letters Patent, is—

1. A hanging basket, a pot, and means for fastening the pot to the basket comprising two detachable members, one member being fastened to the basket, and the other member adapted to be permanently secured to the pot.

2. A hanging basket, means for suspending said basket, a pot extending below and around said basket, and a connection detachably fastening the pot to the basket to support the pot.

3. A hanging basket, a pot, and means for fastening the pot to the basket comprising two detachable members, one member being clamped to the basket and provided with depending wings, the other member secured to the pot and adapted to be supported by said wings.

4. A plant-basket, a pot, and means for fastening the pot to the basket comprising two detachable members, one member being clamped to the basket, the other member comprising a T-bar secured to the bottom of the pot, and suitable packing around the post of the T-bar for preventing leakage from the pot.

5. A plant-basket, a pot, a T-bar bolted to the bottom of the pot, a bracket fastened to the basket, and a pair of wings on the basket engaging the T-bar.

6. A plant-basket, a pot, a T-bar having a threaded post which projects through the bottom of the pot, a flange on the post, an impervious washer between the flange and the bottom of the pot, and means connected with the basket detachably engaging the T-bar.

7. A plant-basket, a pot, a bracket, a stationary clip on the bracket, a clip slidably mounted on the bracket, said clips engaging the basket, and means on the bottom of the pot detachably connecting it to the bracket.

8. A plant-basket, a pot, a bracket, a stationary clip on the bracket, a clip slidably mounted on the bracket, a pair of wings depending from the bracket, and a T-bar connected to the pot and engaging the wings.

9. A plant-basket, a pot, a bracket, a stationary clip on the bracket, a clip slidably mounted on the bracket, a pair of wings depending from the bracket, each wing having a V-shaped notch, and a T-bar connected to the pot, the horizontal bar of the T lying in the notches.

10. A hanging basket having open meshes, a receptacle, and a fastening device for detachably supporting said receptacle below said basket, said device being provided with projecting means adapted to enter a mesh of the basket.

11. A hanging basket having open members, a receptacle, and a fastening device for supporting said receptacle below said basket, said device having oppositely-disposed clamping means provided with projections adapted to enter said meshes.

In testimony whereof I have signed my name to this specification, in the presence of two subscribing witnesses, at Los Angeles, in the county of Los Angeles and State of California, this 9th day of March, 1903.

FRANK NEIDL.

Witnesses:
GEORGE T. HACKLEY,
WILLIE T. WEBB.